Sept. 17, 1946.   O. D. H. BENTLEY   2,407,807
BEARING
Filed Feb. 29, 1944   2 Sheets-Sheet 1

Inventor.
OLIVER D. H. BENTLEY
by Robert T. Palmer
Attorney.

Sept. 17, 1946.    O. D. H. BENTLEY    2,407,807
BEARING
Filed Feb. 29, 1944    2 Sheets-Sheet 2

Inventor.
OLIVER D. H. BENTLEY
By, Robert T. Palmer
Attorney.

Patented Sept. 17, 1946

2,407,807

UNITED STATES PATENT OFFICE 2,407,807

BEARING

Oliver D. H. Bentley, Dover, Mass., assignor to B. F. Sturtevant Company, Boston, Mass.

Application February 29, 1944, Serial No. 524,414

1 Claim. (Cl. 230—207)

This invention relates to bearings for blowers and relates more particularly to air seals for preventing the lubricating oil in such bearings from being withdrawn or forced from the bearings under the pressure differentials set up by the blowers.

In single stage blowers which have bearings in their inlets, the interiors of the bearings usually have pressures therein corresponding to the pressures in the oil sumps into which they drain. The exteriors of the bearings are subjected to lower pressures due to the suctions of the blowers and the differences in pressure have caused oil to be drawn from the bearings into the blowers where it may form explosive mixtures with the oxygen of the air moved by the blowers. The conventional seals do not prevent this oil leakage.

This invention provides a bearing in the inlet of a single stage blower in which air under the same pressure as that in the oil sump is admitted into the bearing around the conventional seals and between same and the shaft lubricating portion of the bearing whereby the lower pressure in the blower inlet draws this air from the bearing, the air stream serving as an air curtain or seal for preventing the leakage of oil from the bearing.

In multi-stage blowers, the exteriors of the bearings between stages are exposed to gas under high positive pressures which tends to force the gas through the usual seals, into the bearings, where it forces the oil from the bearings and by mixture with the oil, forms a froth which builds up until it overflows from the breather pipes and which does not have the desired lubricating qualities.

This invention provides a bearing for a multi-stage blower in which the air under pressure entering the bearing is conducted to atmosphere and prevented from blowing the lubricating oil from the bearing into the oil sump.

An object of the invention is to prevent the pressure differentials set up by blowers from affecting the lubricating oil in the bearings of the blowers.

The invention will now be described with reference to the drawings, of which:

Figure 1:
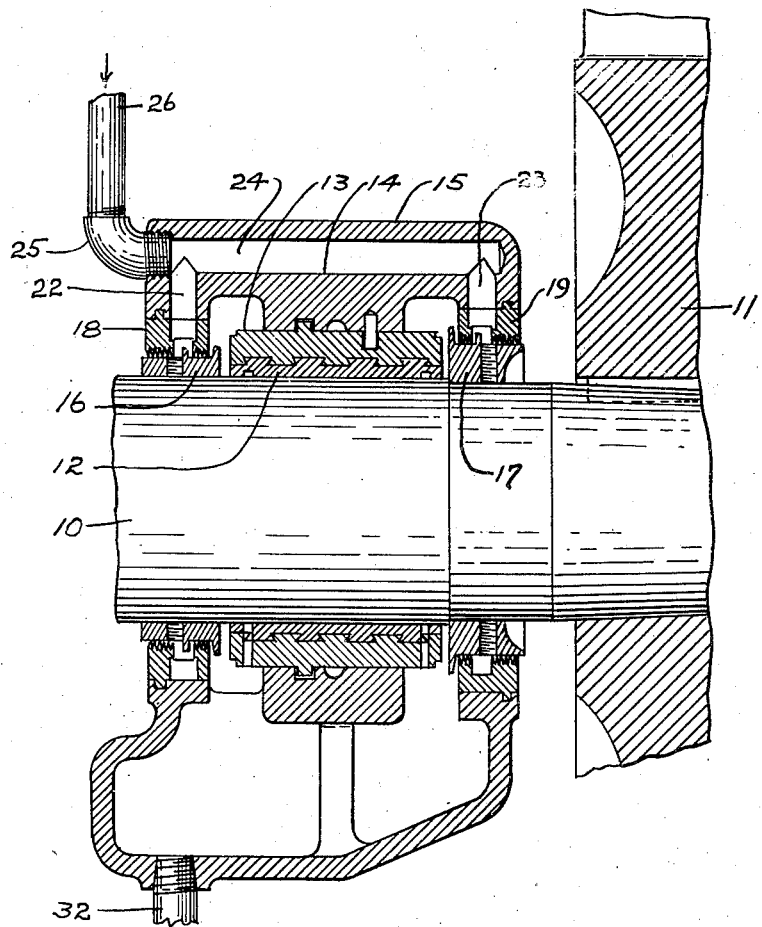
Fig. 1 is a side view, in section, of a bearing embodying this invention, in the inlet of a single stage blower.

The blower shaft 10 has mounted thereon a conventional axial flow blower wheel 11. The shaft 10 rotates in the conventional bearing surface 12 which is attached to the bearing retaining wall 13. The wall 13 is keyed to the inner wall 14 of the bearing housing 15.

The bearing assembly has the conventional oil seals consisting of the annular rings 16 and 17 which are keyed to the shaft 10 for rotation therewith, and the cooperating annular members 18 and 19 which are of some relatively soft material such as brass, which are attached to the wall 14. The member 18 has inner serrated edges contacting the outer surface of the ring 16. The member 19 has serrated edges contacting the outer surface of the ring 17. The serrated edges and the surfaces they contact form the usual oil seals. The lubricating oil from the bearing drains through the pipe 32 into a conventional oil sump.

The assembly described in the foregoing is conventional. In a typical blower installation, the blower including such a bearing assembly may be placed in a plenum chamber where the pressure is —5″ of water. The oil sump into which the bearing drains and the interior of the bearing would be under —5″ of pressure. The pressure at the oil seals formed by the rings 16 and 17 and the cooperating members 18 and 19 is lower due to the suction of the blower and may be —10″. The difference in pressure is sufficient to cause oil to be drawn through such oil seals and into the inlets of the blowers. The oil so drained not only is lost but at times forms undesired combustible and explosive mixtures.

This invention adds the cylindrical, vertical passage 22 in the member 18 and the similar passage 23 in the member 19. The passage 22 extends through the member 18 to the outer surface of the ring 16 and the passage 23 extends through the member 19 to the outer surface of the ring 17. The air passage 24 extends across the bearing structure between the outer wall of the bearing housing 15 and the inner wall 14 and connects with the vertical passages 22 and 23. The elbow fitting 25 is threaded at one end into a tapped opening in a side wall of the housing 15, in alignment with the passage 24, and has one end of the tube 26 threaded into its other end. The tube 26 is continued through the casing of the blower as illustrated by Fig. 2 and opens into the atmosphere surrounding the blower and supplies air having the same pressure as that in the oil sump into the interior of the bearing housing and into the passages 22 and 23.

When a negative pressure is applied to the exterior of the bearing housing which would be sufficient in the prior bearings to draw oil from the bearings between the serrated edges and the annular rings described in the foregoing, in a bearing embodying this invention, the suction draws air through the tube 26 and the passages 24, 22, and 23 and forms an air curtain around the bearing 12 which prevents oil from being drawn from the bearing into the blower inlet.

Figure 3:
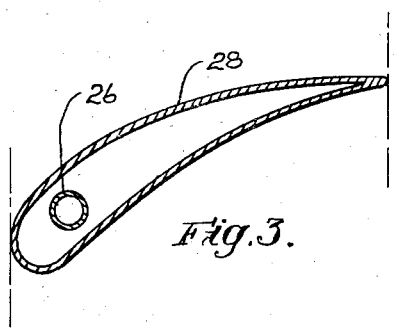
Fig. 3 is a sectional view along the lines 3—3 of Fig. 2.
Figure 2:
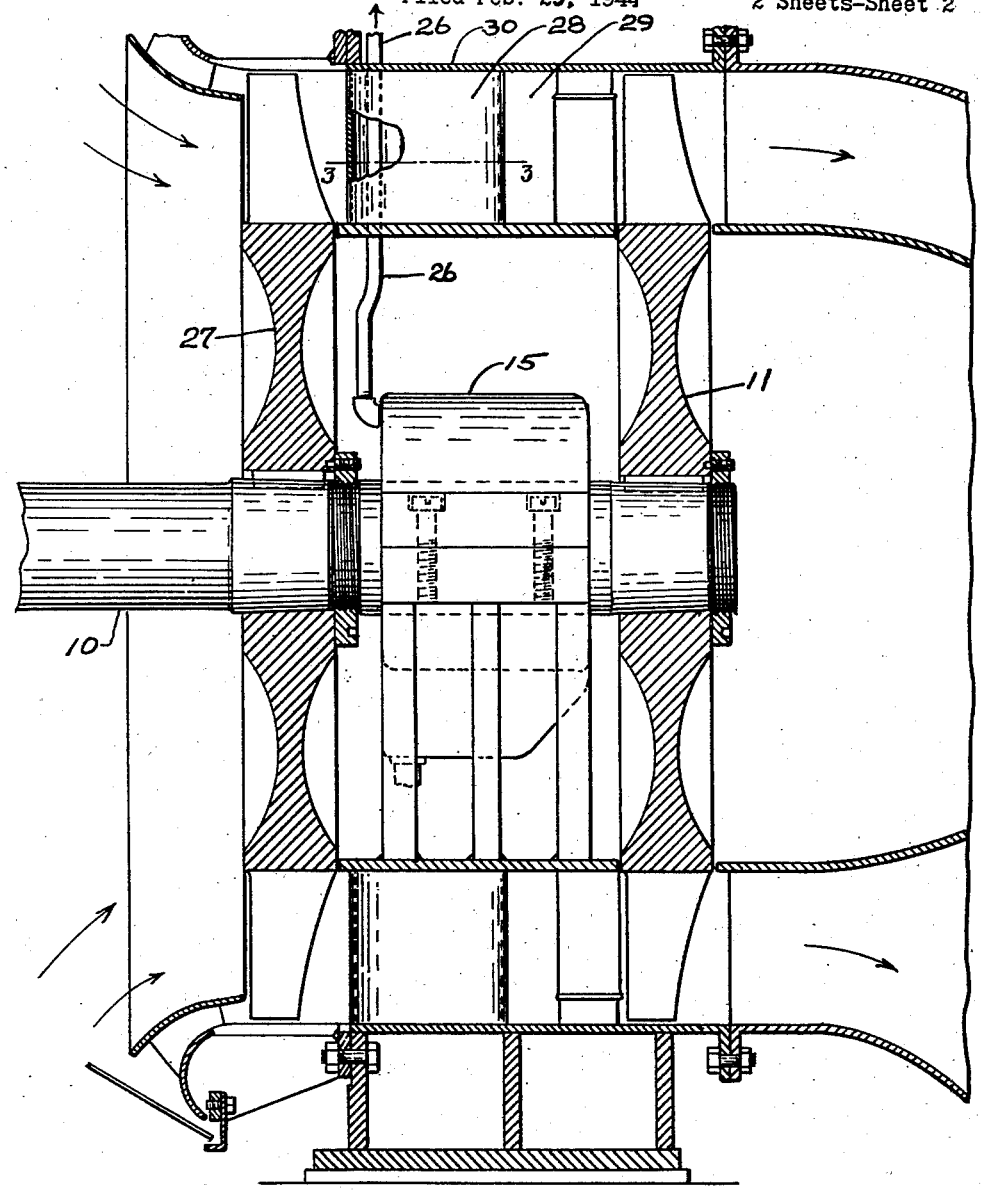
Fig. 2 is a side view, partially in section, of a two stage blower having a bearing embodying this invention, in the inlet of the second stage blower.

Fig. 2 illustrates a bearing similar to that described in the foregoing mounted between the wheels 11 and 27 of a two stage blower. The vanes 28 having airfoil sections are mounted in the passage 29 between the blades of the two wheels and are the usual vanes for taking out the spin in the air from the first stage wheel. The vanes 28 are hollow as illustrated by Fig. 3, and the tube 26 passes through the interior of one of the vanes and thus is removed from the air stream. The tube 26 after passing through one of the vanes 28, passes through the casing wall 30 into the atmosphere to which the blower is exposed.

With a two stage blower such as illustrated by Fig. 2, there is a positive pressure around the bearing which may be 25" of water. This pressure forces the gas moved by the blower into the bearing between the previously described serrated edges and the annular rings which they contact. This gas ordinarily would force the lubricating oil from the bearing into the oil sump and would form a froth in the sump but this is prevented according to this invention by the provision of the passages 22, 23, 24 and the tube 26 which provide a gas passage from the bearing into the atmosphere, which by-passes the inner portion of the bearing containing the lubricating oil. The oil thus is not affected by any leakage of gas into the bearing.

While one embodiment of the invention has been described for the purpose of illustration, it should be understood that the invention is not limited to the exact apparatus and arrangement of apparatus illustrated as modifications thereof may be suggested by those skilled in the art without departure from the essence of the invention.

What is claimed is:

In a blower having a blower wheel with a gas inlet, a supporting shaft for said wheel, a bearing surface around said shaft adjacent the inlet of said wheel, a bearing retaining member attached to said surface, annular rings attached to said shaft on both sides of said surface, a bearing housing around said member and surface, said housing having end walls contacting said rings and having an outer wall spaced from said member and forming therewith a gas passage extending longitudinally of said housing between said end walls, said end walls being spaced from said member for forming gas passages on both sides thereof opening into said longitudinally extending passage, and means forming a gas passage between said longitudinally extending passage and a point external said housing.

OLIVER D. H. BENTLEY.